United States Patent
Chen et al.

(10) Patent No.: US 6,645,656 B1
(45) Date of Patent: Nov. 11, 2003

(54) THIN FILM SOLID OXIDE FUEL CELL AND METHOD FOR FORMING

(75) Inventors: Xin Chen, Houston, TX (US); Naijuan Wu, Houston, TX (US); Alex Ignatiev, Houston, TX (US)

(73) Assignee: University of Houston, Houston, TX (US)

( * ) Notice: Subject to any disclaimer, the term of this patent is extended or adjusted under 35 U.S.C. 154(b) by 0 days.

(21) Appl. No.: 09/534,385

(22) Filed: Mar. 24, 2000

(51) Int. Cl.$^7$ ................................................. H01M 8/10
(52) U.S. Cl. ............................. 429/32; 429/30; 429/33
(58) Field of Search ............................... 429/30, 32, 33

(56) References Cited

U.S. PATENT DOCUMENTS

| | | | |
|---|---|---|---|
| 5,106,654 A | 4/1992 | Isenberg | 427/115 |
| 5,656,387 A | 8/1997 | Barnett et al. | 429/33 |
| 5,753,385 A | 5/1998 | Jankowski et al. | 429/44 |
| 6,326,096 B1 * | 12/2001 | Virkar et al. | 429/30 |

OTHER PUBLICATIONS

Mrowec and Weber, "Gas Corrosion of Metals," National Bureau of Standards and the National Science Foudation (1978).*

Chen et al., "Structure and Conducting Properties of La0.5Sr0.5CoO3 Films on YSZ," Thin Solid Films, 350, 130–137 (1999).*

Jankowski et al. "Testing of Solid–Oxide Fuel Cells for Micro to macro Power Generation," Proc. Electrochem. Soc. (1999), 99–19, Solid Oxide Fuel Cells (SOFC VI), pp. 932–937).*

Michibata, et al., "Preparation of Stabilized Zirconia Electrolyte Films by Vacuum Evaporation," p. 1070–1071 (1990).

Minh, "Ceramic Fuel Cells," *J. Am. Ceram. Soc.*, 76[3] p. 563–588 (1993).

de Souza, et al., "Reduced–Temperature Solid Oxide Fuel Cell Based on YSZ Thin–Film Electrolyte," *J. Electrochem. Soc.*, vol. 144, No. 3, p. L35–L37 (Mar. 1997).

Chen, et al., "Structure and conducting properties of $LA_{0.5}SR_{0.5}CoO_{3-\delta}$ films on YSZ," *Thin Solid Films* 350, p. 130–137 (1999).

Pan, et al., "Pure and doped $Ce_o2$ thin films prepared by MOCVD process," *Thin Solid Films* 324, p. 89–93 (1998).

Coccia, et al., "Pulsed laser deposition of novel materials for thin film solid oxide fuel cell applications: $CeO_{0.9}Gd_{0.1}O_{1.95}$, $La_{0.7}Sr_{0.3}CoO_y$, and $La_{0.7}Sr_{0.3}Co_{0.2}Fe_{0.8}O_y$," *Applied Surface Science* 96–98, pp. 795–801 (1996).

Goyal, et al., "High critical current density superconducting tapes by epitaxial deposition of $YBa_2Cu_3O_2$ thick films on biaxially textured metals," *Appl. Phys. Lett.*, vol. 69 No. 12 (1996).

*Primary Examiner*—Carol Chaney
*Assistant Examiner*—Dah-Wei D. Yuan
(74) *Attorney, Agent, or Firm*—Baker Botts L.L.P.

(57) ABSTRACT

A thin film solid oxide fuel cell (TFSOFC) having a porous metallic anode and a porous cathode is provided. The fuel cell is formed by using a continuous metal foil as a substrate to epitaxially deposit a thin film electrolyte on one surface of the foil. The metal foil may then be made porous by photolithographically patterning and etching the other surface of the foil to form holes extending through the foil to the electrolyte/foil interface. The cathode is then formed on the electrolyte by depositing a second thin film using known film deposition techniques. Further processing may be used to increase the porosity of the electrodes. The metal foil may be treated before film deposition to have an atomically ordered surface, which makes possible an atomically ordered thin film electrolyte.

9 Claims, 9 Drawing Sheets

OTHER PUBLICATIONS

Wu, et al., "High current YBa$_2$Cu$_3$O$_{7-\delta}$ thick films on flexible nickel substrates with textured buffer layers," *Appl. Phys. Lett.* vol. 65, No. 15, p. 1961–1963 (1994).

Chen, et al., "Pulsed laser deposition of conducting porous La–Sr–Co–O films," *Thin Solid Films* 342, p. 61–66 (1999).

Minh, et al., "Electrolyte," Science and Technology of Ceramic Fuel Cells, Chapter 4, p. 69–115, (1995).

Ignatiev, et al, "Photo–Assisted MOCVD Fabrication of YBCO Thick Films and Buffer Layers on Flexible Metal Substrates for Wire Applications," *International Journal of Modern Physics B*, vol. 12, Nos. 29, 30 & 31, p. 3162–3173 (1998).

* cited by examiner a) dense film deposited at 550°C b) porous film developed with room temperature deposition and post annealing a) Sm-CeO2 (111)

b) YSZ (111)

THIN FILM SOLID OXIDE FUEL CELL AND METHOD FOR FORMING

BACKGROUND OF THE INVENTION

1. Field of the Invention

The present invention pertains to electrochemical devices such as solid oxide fuel cells (SOFCs) or ceramic fuel cells, particularly thin film solid oxide fuel cells (TFSOFCs). More particularly, a porous metallic anode and a thin film conducting oxide porous cathode are provided, along with methods for forming the electrodes and a thin film electrolyte.

2. Description of Related Art

Fuel cells are energy-converting devices that use an oxidizer (e.g. oxygen in air) to convert the chemical energy in fuel (e.g. hydrogen) into electricity. A SOFC (also called a "ceramic fuel cell") generally comprises a solid electrolyte layer with an oxidizer electrode (cathode) on one side of the electrolyte and a fuel electrode (anode) on the other side. The electrodes are required to be porous, or at least permeable to oxidizer at the cathode and fuel at the anode, while the electrolyte layer is required to be dense so as to prevent leakage of gas across the layer. A TFSOFC has a thin electrolyte layer, on the order of 1–10 micrometers thick, as described, for example, in U.S. Pat. No. 5,753,385. This reduces the ohmic resistance of the electrolyte and increases the power density of the fuel cell. Because of the low electrolyte resistance, the TFSOFC can operate at lower temperatures. This increases the reliability and allows wider choices of materials for TFSOFC applications. Using the TFSOFC design can also reduce materials costs and reduce the volume and mass of the fuel cell for a given power output.

U.S. Pat. No. 5,753,385 discloses physical and chemical deposition techniques to synthesize the basic components of a TFSOFC. In one technique, the electrodes are formed from ceramic powders sputter coated with an appropriate metal and sintered to a porous compact. The electrolyte is formed by reactive magnetron deposition. The electrolyte-electrode interface is formed by chemical vapor deposition of zirconia compounds onto the porous electrodes.

U.S. Pat. No. 5,656,387 discloses an improved nickel and yttrium-stabilized zirconia (YSZ) anode and a method for making by DC magnetron sputtering. The films were deposited on a surface of yttria-stabilized zirconia (YSZ).

U.S. Pat. No. 5,106,654 discloses a method for matching thermal coefficients of expansion in fuel cell or other electrochemical devices. A tubular configuration not employing thin films is described.

YSZ thin film fuel cells have generally been formed by depositing the YSZ on a substrate that is not crystallographically ordered. Therefore, the YSZ is not ordered and thicker layers must be deposited to form a layer impermeable to gas. Michibata et al ("Preparation of Stabilized Zirconia Electrolyte Films by Vacuum Evaporation," Denki Kagaku, 58, No. 11 (1990) demonstrated growth of dense but not atomically ordered YSZ films on nickel foil. They also provided no mechanism for increasing gas permeability of the nickel foil and claimed very low maximum power output (7 mW/cm$^2$) of a resulting fuel cell.

To make thin film solid oxide fuel cells more efficient and less expensive to fabricate, improved methods for forming the porous electrodes and the non-porous electrolyte used in such devices are needed. The electrolyte should be defect-free to avoid charge and gas leakage across the cell, and thin to provide lower electrical resistance at moderate temperatures. Interconnect layers to make possible stacking of cells should be provided.

SUMMARY OF THE INVENTION

A method for forming a thin film solid oxide fuel cell (TFSOFC) with a porous metallic anode and an oxidizer-permeable cathode on opposite surfaces of a dense electrolyte layer is provided. The electrolyte layer may have an ordered crystal structure.

The fabrication process uses a thin dense metallic material such as nickel foil as a substrate on which to grow the electrolyte. The nickel foil may be appropriately rolled or otherwise processed to produce an ordered crystal structure that allows the electrolyte layer, epitaxially grown on the nickel substrate, to be crystallographically ordered. The nickel foil is later used as the anode after it is made porous by lithographic patterning and etching by chemical or physical processes.

Thin film oxide deposition technologies such as pulsed laser deposition (PLD) or metal organic chemical vapor deposition (MOCVD) can be used for the deposition of the oxide electrolyte as well as for the conducting oxide cathode. PLD is an ideal vehicle to develop very thin films for TFSOFC applications, while MOCVD is good for large area thin film fabrication. Sputtering, evaporation sol-gel, metal organic deposition (MOD), electron-beam evaporation, chemical vapor deposition (CVD), molecular beam epitaxy (MBE), or other oxide film deposition techniques can also be used. Because the substrate is dense and not porous, and in foil form, a dense electrolyte layer is easily deposited on it, and the difficulty of forming a dense, uniform electrolyte layer on a porous substrate is avoided. Also, because the solid metal substrate is used as a support, the electrolyte layer can be very thin. In addition, since the substrate is a continuous foil and can be made atomically ordered, electrolyte film with ordered crystal structure can be grown on appropriately prepared metallic foil substrates such as nickel.

Chemical or physical etching or a physical process such as laser drilling may be used to fabricate pores in the metallic substrate (which will become the anode) after deposition of the electrolyte. The cathode layer can be deposited on the opposite side of the electrolyte layer, either before or after etching or physical drilling of the metallic substrate. The cathode is usually a conducting oxide layer, which can be deposited by PLD, MOCVD or other suitable oxide film deposition technique, thus forming the TFSOFC. A mixed ionic and electronic conductor film between the anode and the electrolyte may be deposited to enhance the activity of the porous anode structure. Stacked cells may be epitaxially grown using a substrate having an atomically ordered surface.

DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
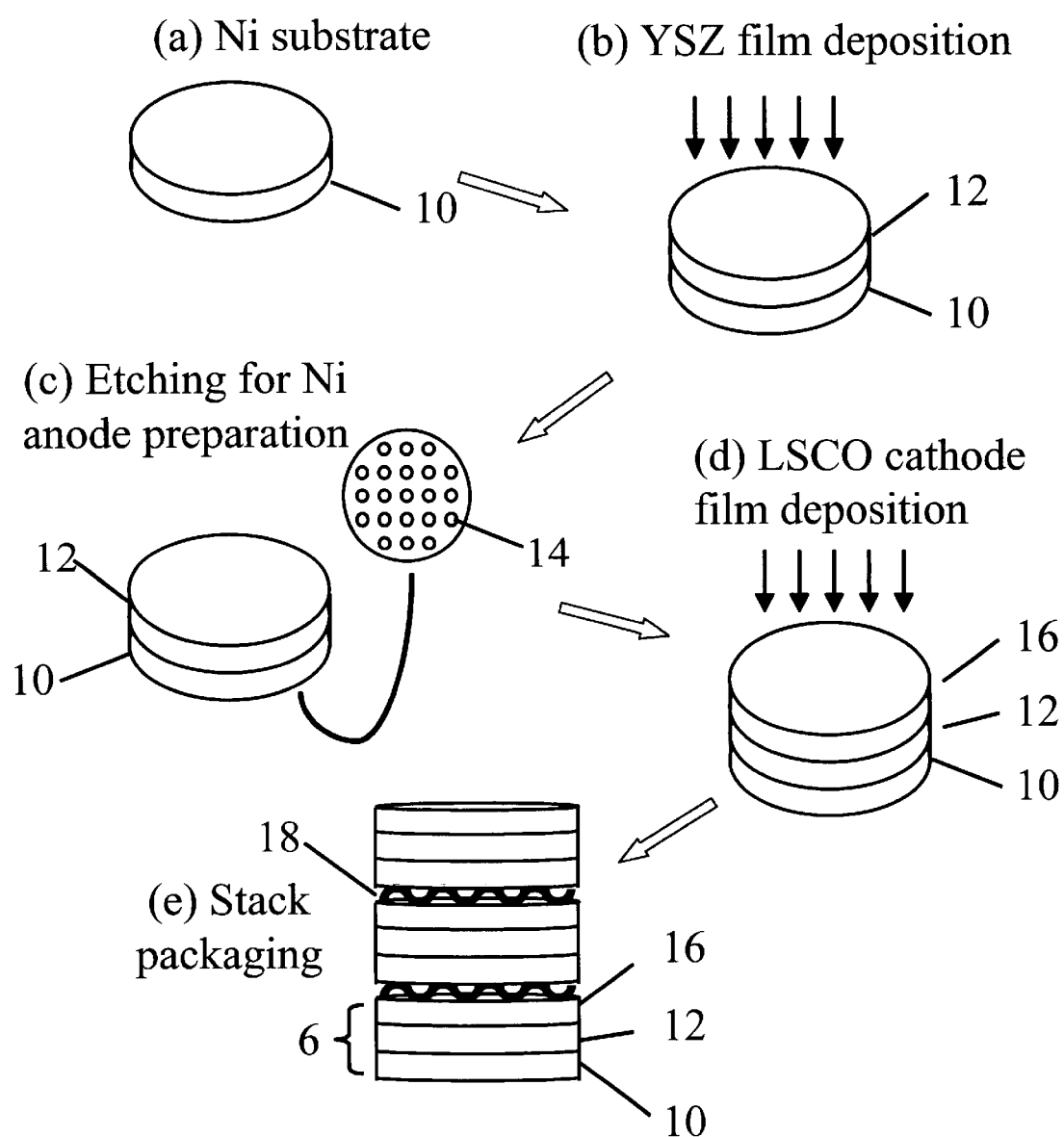
FIG. 1 is a schematic representation of the SOFC process

It is preferred to fabricate a TFSOFC with a thin electrolyte layer to reduce the resistive loss in the electrolyte. The electrolyte layer should be dense and pore-free to prevent gas leakage through it. It is also preferred that porous electrodes be used to increase the gas transport rate. These requirements increase the difficulty in the fabrication of TFSOFCs. We disclose herein an epitaxial film growth method to make a TFSOFC with the combined structure of a dense thin film electrolyte with porous or gas-permeable electrodes. As demonstrated in FIG. 1(a), the method first uses a thin dense metallic material 10, such as nickel foil, as a substrate for the cell fabrication and as the cell anode. A dense but thin electrolyte layer 12 is then deposited on the substrate, as shown in FIG. 1(b), after which substrate 10 is made porous by lithographic patterning and etching, resulting in pores 14 (FIG. 1 (c)) developed in the substrate but not in the electrolyte. Referring to FIG. 1(d), cathode 16 of the SOFC is deposited in thin film form on electrolyte 12, either before or after etching of anode 10. Further processing can be used to improve the permeability and performance of the electrodes, as disclosed below. The SOFCs fabricated by this method can then be packaged into stacks, as indicated in FIG. 1(e), where interconnects 18 couple the SOFCs.

Figure 2:
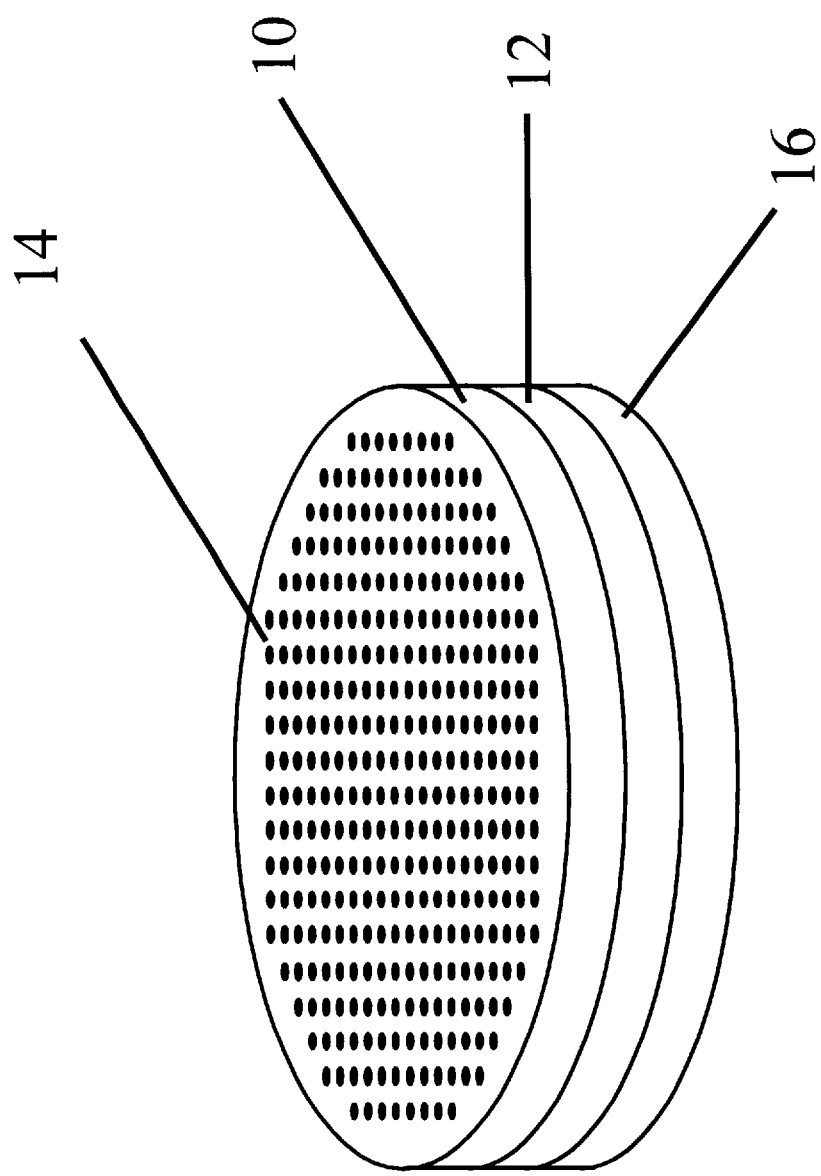
FIG. 2 is a schematic representation of a solid oxide fuel cell with a porous metallic electrode.

A schematic example of a SOFC fabricated with the method provided here is shown in FIG. 2. Metal substrate and anode 10 has been used in an epitaxial deposition process to form electrolyte layer 12. Cathode 16 has been formed on electrolyte 12. Pores 14 are fabricated in metal substrate 10 by etching or physical drilling.

A preferred embodiment of a process for making a thin film solid oxide fuel cell is described as follows. It should be understood that the description of a preferred embodiment does not limit the scope of the methods and apparatus disclosed herein.

A nickel foil with a nominal thickness of 0.001 inch is used as the substrate and the anode of the device. The substrate/anode thickness can be varied to accommodate a specific fuel cell design. Any metal or alloy that is stable under the operating temperature and reducing atmosphere at the anode can be used. The nickel foil can be also treated to expose an atomically ordered surface by roll-texturing as described by A. Goyal et al "High critical current density superconducting tapes by epitaxial deposition of $YBa_2Cu_3O_x$ thick films on biaxially textured metals", 69(12) Appl. Phys. Lett. 1795 (1996), or by Ion Beam Assisted Deposition (IBAD) as described by X. D. Wu et al, "High current $YBa_2Cu_3O_{7-\delta}$ thick films on flexible nickel substrates with textured buffer layers", 65(15) Appl. Phys. Lett. 1961 (1994),both of which articles are incorporated by reference herein. Such an atomically-ordered surface allows for the growth of an atomically ordered electrolyte layer as well as subsequent layers such as the cathode and even the conducting interconnect layers that could act as substrate for growth of stacked cells.

An electrolyte thin film oxide layer is deposited on the substrate/anode by, for example, PLD. Yttria stabilized zirconia (YSZ) is an example of a solid oxide electrolyte (although other solid electrolytes may be used), and with PLD a target of YSZ is used to deposit a thin film of YSZ on the metallic substrate/anode. Pure hydrogen or "forming gas" (4% hydrogen with 96% argon) or other reducing gas mixtures can be introduced into the thin film deposition chamber to reduce oxidization of the nickel or other metal substrate under any of the oxide thin film growth techniques. Other thin film oxides that can be used as electrolytes include doped $LaGaO_3$, doped $CeO_2$ and multilayers of oxides such as YSZ/doped-$CeO_2$.

As an example, PLD using an excimer laser can be used for the deposition of the electrolyte films. The thin film growth may be continued to yield an electrolyte layer having a thickness in the range from about 0.01 to about 10 micrometers (depending on the application). The electrolyte layer formed on a typical metal foil substrate generally has no long range atomic order. However, the electrolyte may be preferentially atomically ordered with its (100) crystallographic direction normal to the growth surface or with atomic order both normal to and in the plane of the growth surface (the surface of the substrate) by using an atomically ordered substrate. For example, using roll-textured metal foil or IBAD-treated metal foil such as described above, the electrolyte can be grown with atomic order both normal to and in the plane of the growth surface.

Figure 3:
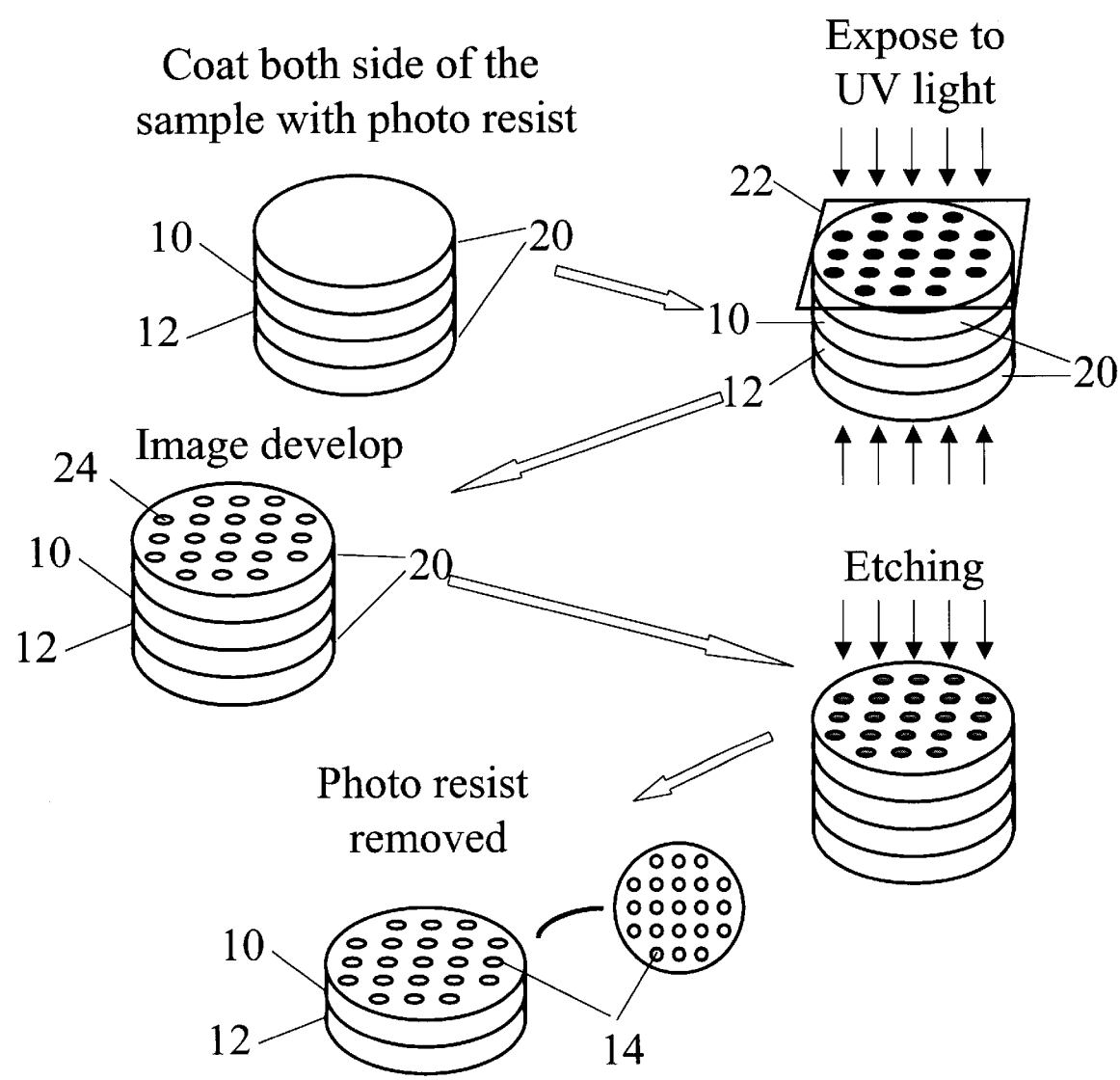
FIG. 3 illustrates the patterning process for the metallic anode.

The metallic substrate/electrolyte thin film structure may then be subjected to a patterning and etching procedure to fabricate pores in the metallic anode. Photolithography is used to pattern areas of the substrate to be etched with a pore design defined by a mask. The mask that is used as the template for the patterned pores can have various patterns in addition to just circular holes. The mask may have star patterns, for example, or irregular shaped holes to increase the perimeter of the etched holes in the anode. The patterning process is shown in FIG. 3, where 10 indicates, for example, the nickel substrate and 12 indicates the YSZ thin film. One side or both sides of the structure are coated with photo-resist 20, depending on materials used. A photo-resist film of several hundred to several thousand nanometers thickness is made on the nickel substrate by spin-coating photo-resist on the sample, using well known techniques. After baking the photo-resist, mask 22 is put on the sample and the resist on the nickel or substrate side is exposed to UV light through the mask. The sample is then put into a developer solution and the pattern is developed on the photo-resist. After development, the sample is rinsed and the area shadowed by the mask is removed, while that exposed to UV light stays attached to the substrate. The sample is then post-baked to stabilize photo-resist layer 20, which exhibits holes 24 developed in the photo-resist.

Figure 4:
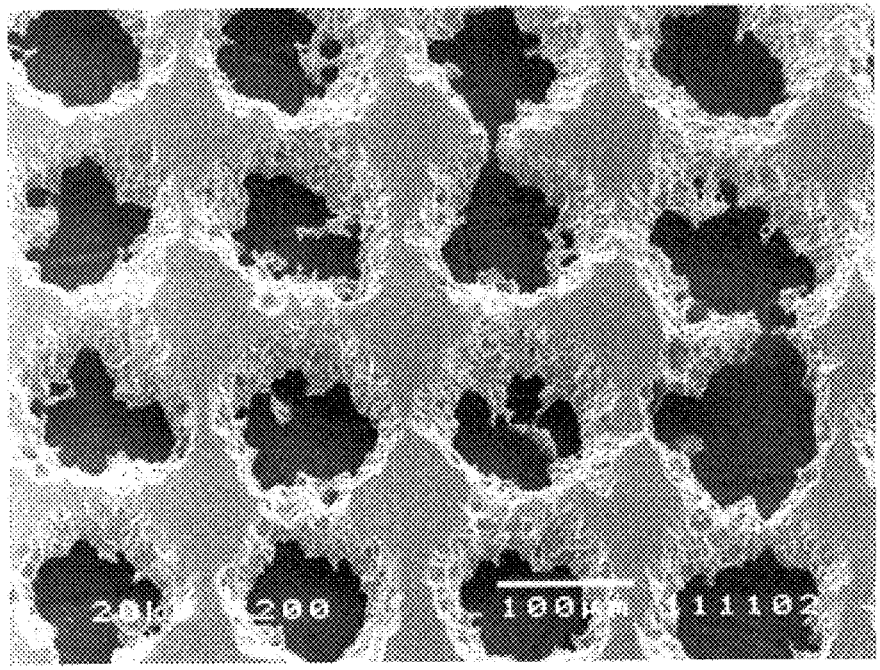
FIG. 4 shows an SEM micrograph of a patterned and etched nickel anode.

Either a wet or dry etching process may be used. For wet etching, the complete structure is placed in an etching solution such as (but not restricted to) ferric chloride for etching the metallic nickel substrate/anode and not the electrolyte. Other etching solutions could also be used for nickel or other metallic substrate etching. The thin film structure is maintained in the etching bath until the patterned nickel area without photo-resist is etched through (approximately 180 minutes at a temperature of 18° C. for a 0.001" metallic nickel substrate foil, for example). Other times and temperatures may be selected. The photoresist is then removed with acetone, and a YSZ/porous-nickel structure is formed. FIG. 4 is the SEM micrograph of a patterned sample showing an array of holes through the nickel. The etch process is such that it leaves the oxide electrolyte intact, thus not resulting in gas leakage through the electrolyte, which would reduce performance of the fuel cell. For physical formation of porosity, a process such as ion beam etching, reactive ion etching or laser drilling may be used to pattern the anode. Again, holes should not be created through the electrolyte layer.

Figure 5:
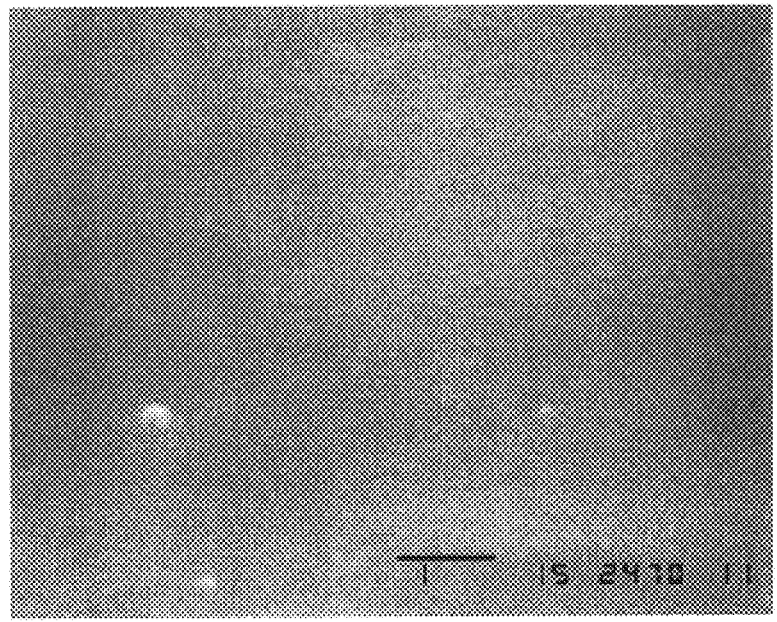
FIG. 5 shows an SEM micrograph of LSCO films on YSZ developed by PLD: a) a dense film; b) a porous film.
Figure 5:
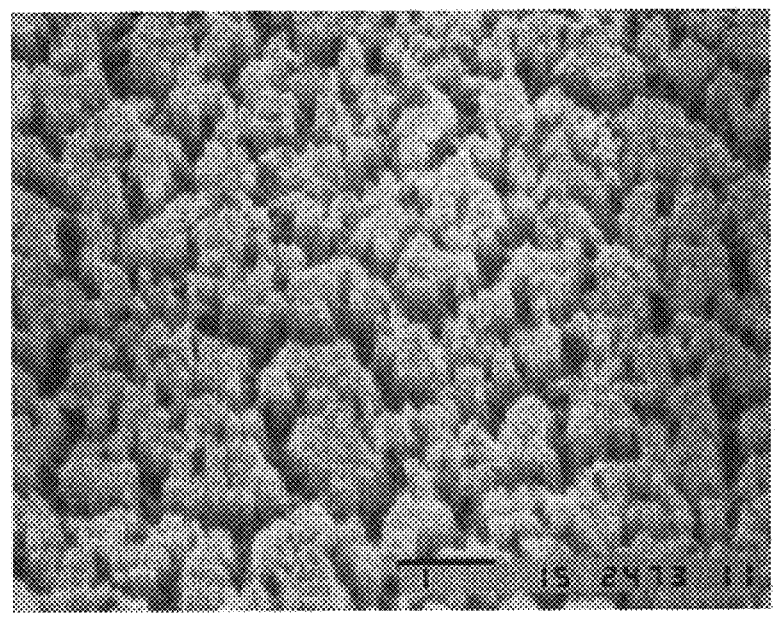

A conducting oxide cathode thin film is then deposited on top of the oxide electrolyte (YSZ) to form the SOFC. A $La_{0.5}Sr_{0.5}CoO_{3-\delta}$(LSCO) thin film is used as the cathode material in this example, although other oxide thin film cathode materials can also be used. The LSCO thin film cathode can also be deposited by PLD, sputtering, MOCVD or other oxide deposition techniques. FIG. 5a is an SEM micrograph of an LSCO cathode deposited on YSZ by PLD, showing that the LSCO film is dense and pore-free. There are small particles on the PLD-formed LSCO film, which are often seen on oxide films fabricated by PLD. This may be good for SOFC development since it increases the surface area and could increase the reaction rate at the cathode. Details of PLD deposition of LSCO on YSZ are described by Xin Chen, Naijuan Wu, Alex Ignatiev, Zuhua Zhang and Wei-Kan Chu in "Structure and Conducting Properties of $La_{0.5}Sr_{0.5}CoO_{3-d}$ Films on YSZ", 350, *Thin Solid Films*, 130 (1999), which is incorporated by reference herein. For the case of an atomically ordered electrolyte, i.e. one formed on an atomically ordered substrate, the cathode can also be deposited under conditions such that it is also atomically ordered, i.e. it is grown epitaxially on the ordered electrolyte with, e.g., the (100) direction normal to the electrolyte surface and having additional in-plane ordering.

Additional porosity may be desired in the cathode. The cathode can be made more porous by specific processing as described by X.Chen, N. J. Wu, D. L. Ritums and A. Ignatiev in "Pulsed Laser Deposition of Conducting Porous La—Sr—Co—O Films", 342, *Thin Solid Films*, 61–66 (1999), which is incorporated by reference herein. To enhance LSCO film porosity, the LSCO films can be deposited at room temperature onto the electrolyte and then heated to high temperature for several hours resulting in a porous columnar structure. The electrical conductivity of the LSCO is maintained in this process at a level of ~$10^{-3}$ ohm-cm or better. FIG. 5b is an SEM micrograph of a porous LSCO film fabricated on YSZ by PLD.

The above example shows one instance of application of the method disclosed herein for the fabrication of planar thin film solid oxide fuel cells. It can also be used in other designs such as tubular and monolithic fuel cells. It also not only applies to SOFC's with a simple electrolyte layer, but also to those with complex electrolytes such as a YSZ/doped $CeO_2$ multi-layer electrolyte. It not only applies to SOFC's, but it also applies to the fabrication of other electrochemical devices with combined thin film electrolyte/porous electrode structure. The thin oxide films can be deposited not only as non-ordered polycrystalline films, but also as crystallographically ordered films.

Figure 6:
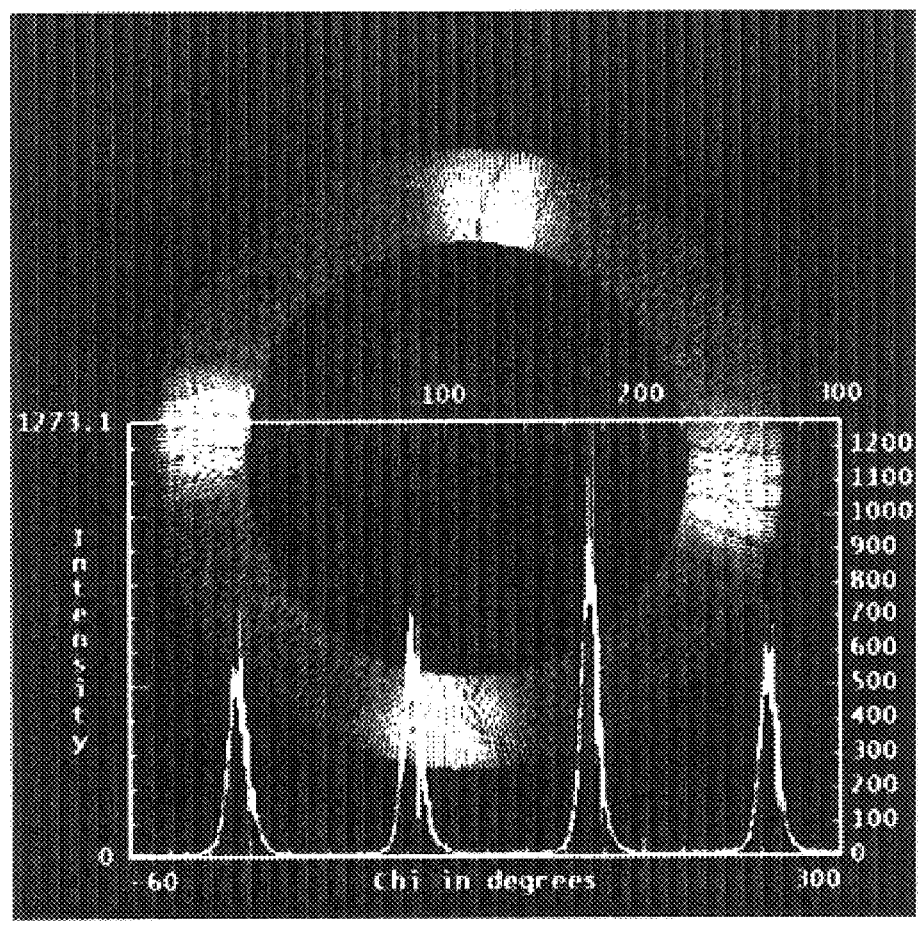
FIG. 6 shows the x-ray diffraction pole-figure and phi-scan of the (111) peak of YSZ deposited on roll-textured nickel foil indicating atomically ordered YSZ grown on roll-textured nickel foil.
Figure 7:
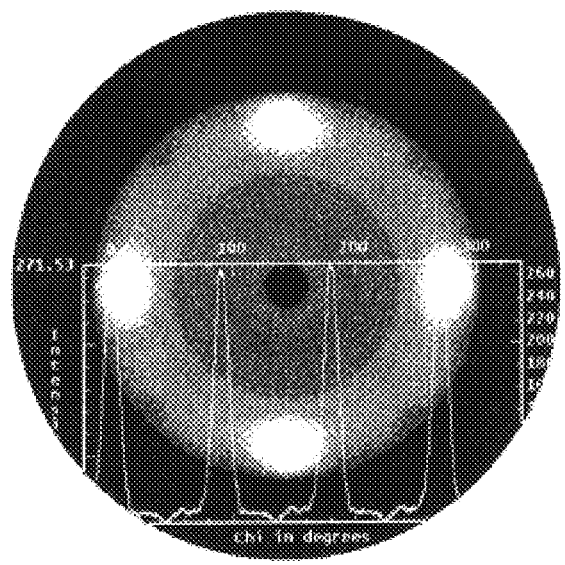
FIG. 7 shows the x-ray diffraction pole-figures and phi-scans of the (111) peaks of YSZ and of Sm-doped $CeO_2$ for a YSZ/Sm—$CeO_2$ multilayer structure grown on roll-textured nickel foil indicating atomically ordered doped $CeO_2$ and subsequently grown atomically ordered YSZ.
Figure 7:
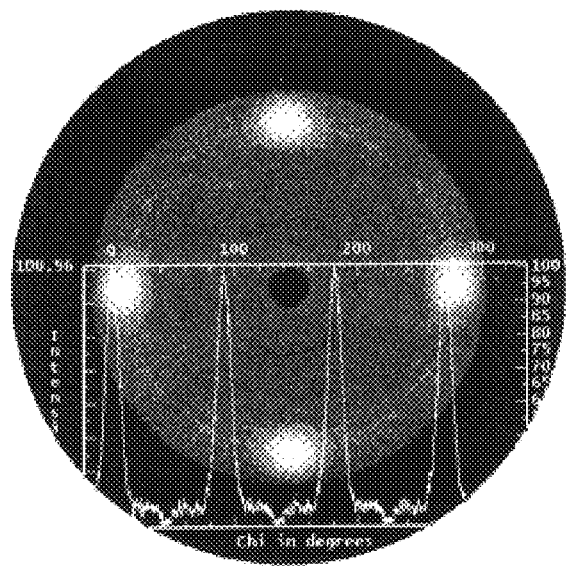

N. O. Minh has described in *Science and Technology of Ceramic Fuel Cells*, Elsevier Science B. V. (1995), that grain boundaries usually have much lower ion conductivities than the bulk of an electrolyte material. By developing crystallographically ordered thin electrolyte films, grain boundaries can be reduced or even removed in the electrolyte, thereby increasing ion conductivity and reducing the resistance of the electrolyte. Crystallographically-ordered films of YSZ and $CeO_2$ have been deposited on metallic substrates using a unique photo-assisted MOCVD technique (PhAMOCVD) as described by A. Ignatiev, P. C. Chou, Q. Zhong, X. Zhang, and Y. M. Chen, "Photo-Assisted Fabrication of YBCO Thick Films and Buffer Layers on Flexible Substrates for Wire Applications", 12, *International Journal of Modern Physics B*. 3162 (1998), which is incorporated by reference herein. This technique has been used to fabricate highly ordered YSZ/$CeO_2$ multi-layers on roll-textured nickel foils, as demonstrated by the x-ray diffraction (XRD) data shown in FIGS. 6 and 7. FIG. 6 is an XRD pole-figure and phi-scan of the (111) peak of YSZ deposited by PhAMOCVD on roll-textured nickel foil. FIG. 7 is the XRD pole-figure and phi-scan of the (111) peak of YSZ and Sm doped $CeO_2$ from a YSZ/Sm—$CeO_2$ sample developed on roll-textured nickel foil with PLD. The full width at half max (FWHM) of the phi-scan peaks in both figures are only several degrees wide, indicating good crystalline ordering of the YSZ film on the metallic substrate and of the YSZ film grown on the Sm—$CeO_2$ layer. This epitaxial growth technique can be directly used for the SOFC development to test for good crystalline ordering of the YSZ film, which is indicative of the desired high electrical conductivity of the electrolyte.

This disclosure is not limited to the examples of thin film oxide materials cited above. For example, $La_{1-x}Sr_xMnO_3$, a widely used cathode material for SOFCs, may be used with the methods disclosed here. It has high electrical conductivity, adequate chemical and structural compatibility with YSZ electrolytes, and an acceptable coefficient of thermal expansion match with other SOFC components. $La_{1-x}Sr_xCo_{1-y}Fe_yO_{3-\delta}$ and $La_{1-x}Sr_xCo_{1-y}Mn_yO_3$ are other cathode materials that may be used for SOFCs working at lowered temperature. Elements such as Y, Ca, Ba, Pr, Nd, Cu, and Ni can also be used to replace elements in the cathode material in order to modify the characteristics and performance of the cathode. Cathodes containing $In_2O_3$ and $RuO_2$ can also be used as they may yield excellent electrical conductivity for SOFC applications. The cathode can be formed before the etching of the anode or after the etching.

The electrolyte can also be varied by incorporating not only YSZ but also other electrolyte materials such as doped-$CeO_2$, stabilized $B_2O_3$, perovskite oxide ion conductors such as $La_{1-x}Sr_xGa_{1-y}Mg_yO_3$ and doped $BaCeO_3$ and pyrochlore oxides (with the general formula $A_2B_2O_7$) such as $Gd_2(Zr_xTi_{1-x})_2O_7$ and $Y_2(Zr_xTi_{1-x})_2O_7$. In addition, not only can single layers of electrolyte be used, but multi-layer and more complicated electrolyte structures can be formed. For example, doped $CeO_2$, when used as an electrolyte, has very high ionic conductivity and also shows reduced overvoltage at the electrode/electrolyte interfaces. However, $CeO_2$ can be reduced at low oxygen partial pressures to exhibit electronic conductivity. If a YSZ/doped-$CeO_2$ multi-layer structure is used for the electrolyte, as in the example shown in FIG. 7, the ion conductivity advantage of doped-$CeO_2$ is retained, while the electronic conductivity problem can be mitigated by the insulating YSZ layer.

Figure 8:
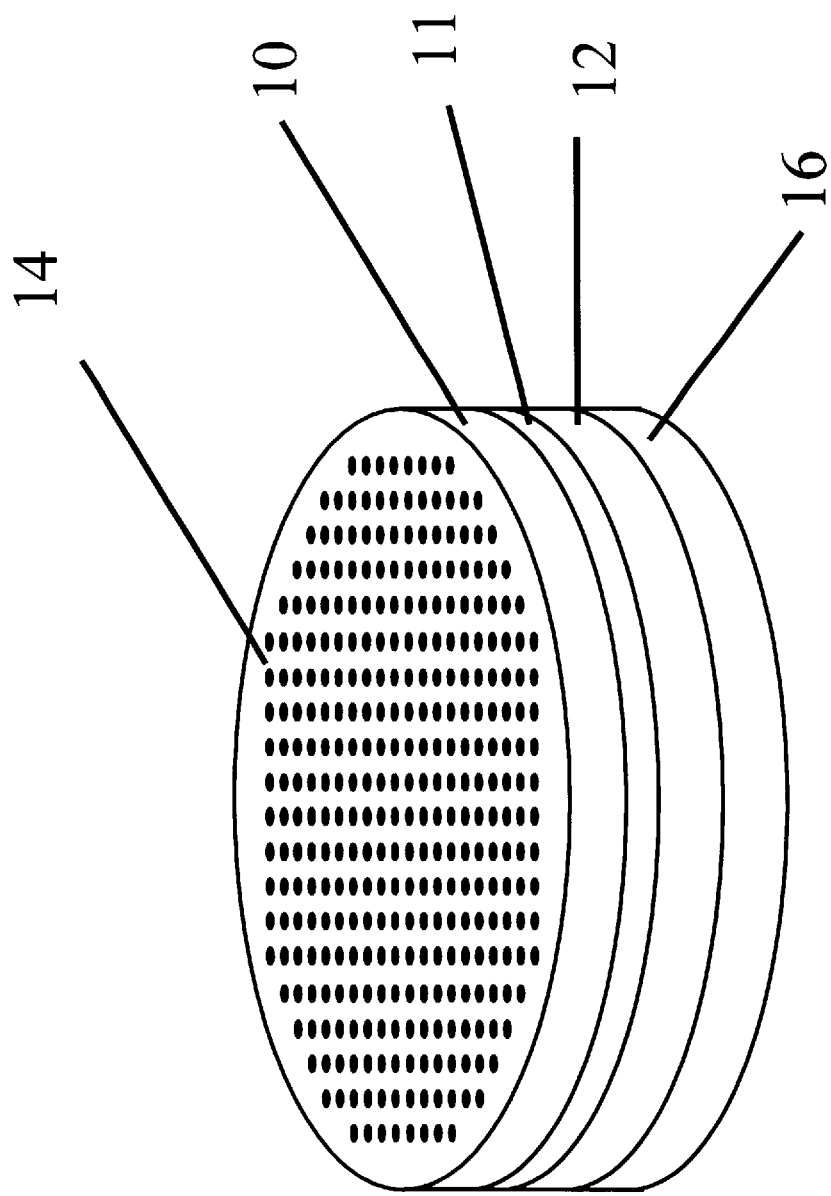
FIG. 8 illustrates a mixed ionic and electronic conductor film between the anode and electrolyte films.

The anode can be fabricated not only from nickel, but may be made from other metals and alloys such as INCONEL, Haynes Alloy or HASTELLOY. In addition, the metal substrate can be treated with a buffer layer or layers so as to better integrate with the thin film electrolyte. These buffer layers may be of varying structure and composition, and will generally be used to match lattice parameters of the substrate and overlayer for optimal epitaxial growth, to better match thermal expansion coefficients of the substrate and overlayer to minimize thermal stress cracking, and to act as diffusion barriers to mitigate interdiffusion of species from or to the substrate to or from the overlayer, while still maintaining the fuel cell electrochemical requirements of reduced interface resistance and high ionic conductivity. Since the fuel-oxidizer activity for the YSZ/Nickel anode structure is mostly limited to the three-phase boundary, the overall activity of the porous anode structure fabricated by etching can be enhanced by increasing the area of the 3-phase boundary. This can be done in several ways including the already noted patterning of high-perimeter pores in the anode, the addition of a layer of porous anode material such as a nickel-YSZ cermet onto the anode after etching, or the deposition of a mixed ionic and electronic conductor film between the anode and the electrolyte. Such a mixed ionic/electronic conducting film is shown at 11, FIG. 8. The film will not limit anode activity only to the three-phase boundary, but can extend it to the whole exposed mixed conductor surface. For example, doped-$CeO_2$ can be reduced to show mixed conducting character and can be used for the purpose of forming film 11. To exhibit mixed conductor behavior, the doped $CeO_2$ film can be grown under highly reduced conditions. $CeO_2$ can also be reduced by changing its doping level and/or dopant material. Another possible enhancement at the anode is to use a hydrogen-conducting metal or alloy such as palladium or palladium alloy as the anode for a proton type SOFC.

The anode formation method disclosed herein is different from existing techniques that form a porous anode on an electrolyte surface in that it uses the metallic anode foil both as substrate and support. As a result, the electrolyte layer can be made very thin, avoiding the self-supporting problem for a thin electrolyte layer in SOFC fabrication.

Any interconnect material can be used for the SOFC design disclosed here as long it is stable to both the oxidizing and reducing environments of the fuel cell. For example, $LaCrO_3$ is the most used interconnect material for SOFCs. Other interconnect materials include oxides such as doped $LaCrO_3$, doped $CoCr_2O_4$ and doped $YCrO_3$, metals and alloys such as nickel, chromium, INCONEL, and chromium-iron alloys, and oxide-dispersed or coated metals and alloys. Metals and alloys are of great interest for use as an interconnect material in the TFSOFC disclosed here because they may be the same material as the anode disclosed here (e.g., as described in U.S. Pat. No. 5,106,654, where nickel foil is used as an interconnect for an SOFC) and they may be fabricated at the same time as the anode. Metals and alloys can be made oxidation-resistant and hence can work well at SOFC working temperatures, especially for low temperature SOFCs. Oxide dispersion and oxide coating can improve the oxidation resistance and strength of the metals and alloys, and also improve the thermal match with other SOFC components. In addition, when these metals and alloys are the same as the anode material, the SOFC fabrication can be greatly simplified. The interconnect material can be deposited using thin film deposition techniques disclosed here for depositing other films in the SOFC. For example, PLD, MOCVD, sputtering, evaporation or chemical deposition may be used. These films can then be patterned to provide the flow channels needed for fuel and oxidizer transport in the interconnect region.

The commonly used stack designs can be used with the materials and methods disclosed here. For example, the methods disclosed here can be used to fabricate SOFC stacks with tubular, segmented-cell-in-series, monolithic, and flat-plate designs. Monolithic, and flat-plate design are of the greatest interest with the systems disclosed here, because the SOFCs can be made in a planar shape, which is good for forming a porous anode by patterning and etching using photolithography. A tubular fuel cell can be fabricated on a tubular metal substrate or on a flat metal foil, which is flexible and can be bent into tubular form after the film deposition processes.

Figure 9:
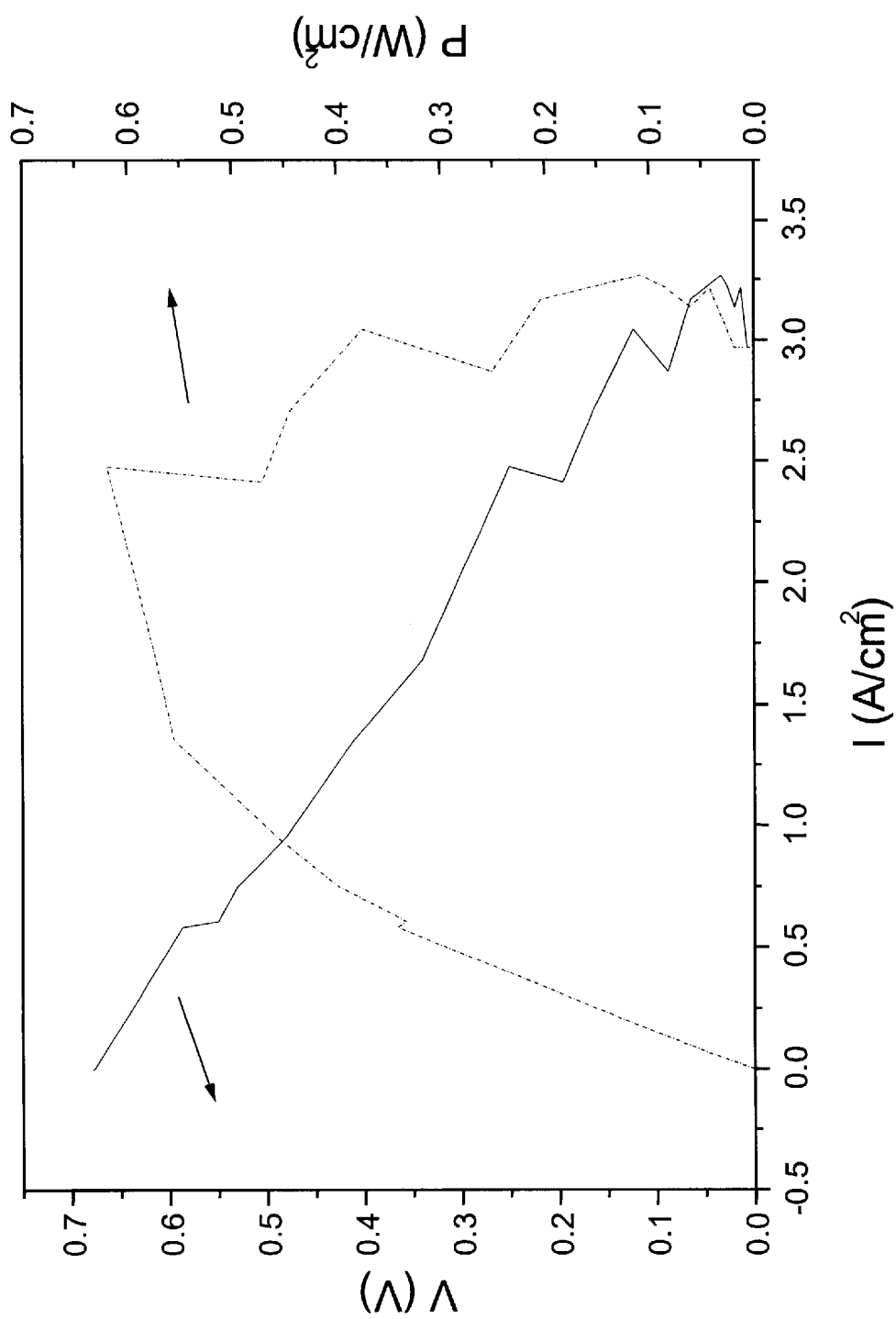
FIG. 9 shows measured values of power output from a fuel cell formed according to methods disclosed herein.

A fuel cell was fabricated by the methods described above and outlined in FIG. 1. The data were obtained for a fuel cell incorporating a patterned atomically textured nickel anode, an atomically ordered YSZ electrolyte layer and an atomically ordered LSCO cathode layer. The cell had a total area of 0.25 $cm^2$. The electrodes and electrolyte were formed by the PLD process. The fuel cell was supplied hydrogen and oxygen and electrical current and voltage output were measured. Results are shown in FIG. 9. Note that maximum power output was more than 600 $mW/cm^2$. This is a very satisfactory result. In comparison, for example, the fuel cell of Michibata referenced above produced a maximum of 7 $mW/cm^2$.

The foregoing disclosure and description are illustrative and explanatory thereof, and various changes in the details of the method and apparatus can be made without departing from the spirit of the invention.

We claim:

1. A solid oxide fuel cell, comprising:
    an anode film, the anode film being a metal foil having a first and second side, wherein the second side of the metal foil has an atomically ordered surface, the metal foil being made porous from a plurality of holes entering from the first side of the foil and extending to the second side;
    an electrolyte film having a first and second side and plane, the first side of the electrolyte film being deposited on the second side of the metal foil; and
    a cathode film, the cathode film being deposited on the second side of the electrolyte film.

2. The solid oxide fuel cell of claim 1 further comprising: a mixed ionic and electron conductive film between be electrolyte film and the cathode film wherein the mixed ionic and electron conductive film is comprised of doped cerium oxide.

3. The fuel cell of claim 1 wherein the electrolyte film is comprised of a solid oxide selected from the group of solid oxides consisting of doped $LaGaO_3$ and doped $CeO_2$.

4. The fuel cell of claim 1 wherein the electrolyte film is atomically ordered.

5. The fuel cell of claim 1 wherein the second side of the metal foil has an atomically ordered surface and the electrolyte film is atomically ordered normal to the plane and in the plane of the electrolyte film.

6. The fuel cell of claim 1 wherein the electrolyte film is atomically ordered and the cathode film is atomically ordered.

7. The fuel cell of claim 1 wherein the porosity of the cathode film is at least partially made up of a columnar structure formed when the cathode film is deposited at a lower temperature and subsequently heated to a higher temperature.

8. A stack of fuel cells, comprised of at least two fuel cells of claim 1 interconnected by an electrically conducting material stable to oxidizing and reducing conditions between the fuel cells wherein the electrically conducting material is $LaCrO_3$.

9. A stack of fuel cells comprised of at least two fuel cells of claim 1 interconnected by an electrically conducting material stable to oxidizing and reducing conditions between the fuel cells wherein the fuel cells have a tubular shape.

* * * * *